L. BECK.
LOCK NUT.
APPLICATION FILED JULY 6, 1911.
1,017,371.
Patented Feb. 13, 1912.
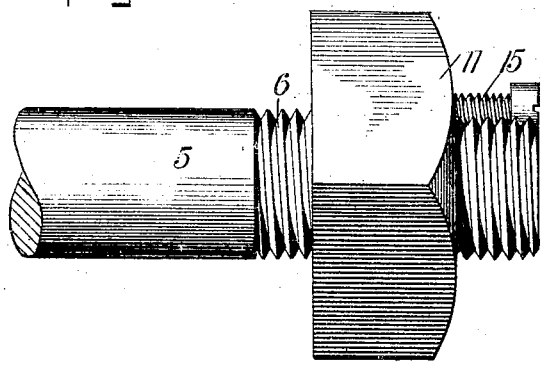
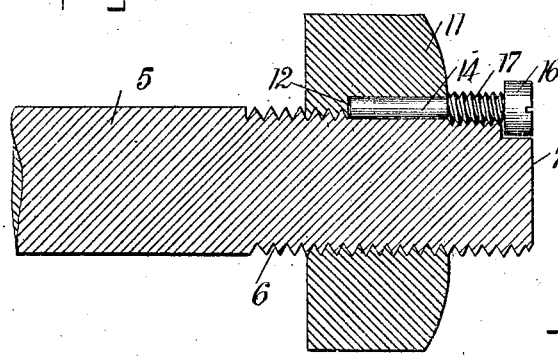
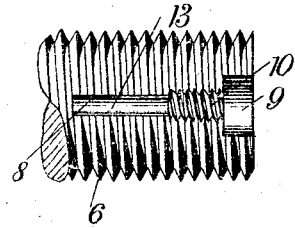
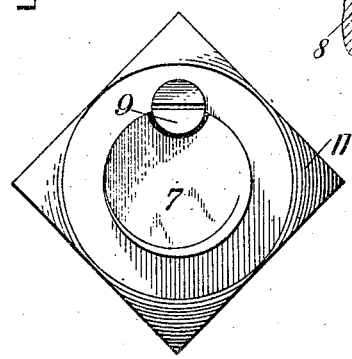
WITNESSES
Sidney Brooks
W. S. Orton.
INVENTOR
Larkin Beck
BY Munn & Co
ATTORNEYS

UNITED STATES PATENT OFFICE.

LARKIN BECK, OF KIRKLAND, NEW MEXICO.

LOCK-NUT.

1,017,371.  Specification of Letters Patent.  Patented Feb. 13, 1912.

Application filed July 6, 1911. Serial No. 637,104.

*To all whom it may concern:*

Be it known that I, LARKIN BECK, a citizen of the United States, and a resident of Kirkland, in the county of San Juan and State of New Mexico, have invented a new and Improved Lock-Nut, of which the following is a full, clear, and exact description.

My invention relates to lock nuts for bolts, shafts or axles, or in any machinery carrying nuts that may have a tendency to work loose.

An object of my invention is to provide a new and improved form of lock nut so constructed that the same is positively locked in position and securely and efficiently held in place, and which, at the same time, may readily be detached whenever it is desired to remove the nut from the bolt.

I attain the above-outlined object by providing a semi-cylindrical groove extending longitudinally in the threaded portion of the bolt, and by providing a similar groove in the threaded portion of the nut, tapping out the alined grooves, into which tapped-out portion may be inserted a threaded key to hold the bolt and nut in position.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming part of this specification, in which similar characters of reference indicate corresponding parts in all the figures, and in which—

Figure 1 is a side end elevation showing a preferred embodiment of my invention; Fig. 2 is a longitudinal sectional view taken through the bolt and nut; Fig. 3 is an end view of the device looking from the right-hand side of Fig. 1, and Fig. 4 is a fragmentary side elevation of the threaded portion of the bolt.

In the several figures, I have shown a bolt 5 having a threaded end 6, which threaded portion has extending from the end 7 a substantially semi-cylindrical groove 8. The outer end of this groove has an enlarged portion 9, into which is adapted to fit the head of the key hereinafter described. Adjacent the enlarged portion 9 the groove is tapped out for a portion of its length to form threads 10 of twice the pitch of the threads 6. The nut 11 is worked on to the threads 6. The bore of the nut 11 has a semi-cylindrical groove 12 therein, which groove is adapted to be alined with the smooth portion 13 of the groove 8, into which smooth portion formed by the groove 12 and smooth portion 13 of the groove 8 is adapted to be inserted the smooth portion 14 of a pin 15, which pin has a head 16 adapted to fit into the enlarged recess 9. The pin 15 is threaded between the head 16 and smooth portion 14, with threads 17 of the same pitch as the threads 10.

It will be seen by the above construction that the nut 11 is rotated on to the threaded portion 6 of the bolt 5 until the grooves in the bolt and nut are in radial alinement. Then the pin 15 is inserted, so that the smooth portion thereof will fit between the grooves in the nut and bolt and will be threaded into position on the threads 10, which will firmly lock the bolt and nut in place.

While a preferred embodiment of the invention has been described, it is to be understood that many changes could be made in the above construction and many apparently widely different embodiments of this invention could be made without departing from the scope thereof.

It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and relativities of parts are non-essential, except as called for in the claims.

Having thus described my invention, I claim as new and desire to secure by Letters Patent:

1. A bolt having a threaded end, a nut threaded to said end, said nut having a groove therein opening into the bore thereof, a groove in said threaded end, extending longitudinally from the outer edge thereof, an outer portion of said groove having screw threads tapped therein, and a pin fitting in said groove and threaded on to said tapped portion the inner end of said pin being smooth and adapted to be inserted in the groove in said nut.

2. In combination, a threaded bolt, a nut adapted to be threaded on said bolt, the bore of said nut having a semi-cylindrical groove opening thereinto and extending part way through said nut from one side thereof, a similar threaded bolt having a correspondingly formed semi-cylindrical groove adapted to be alined with the groove in the nut, to form a smooth bored pocket in said bolt and nut, the groove in said bolt external of said pocket being threaded, and a pin having a smooth portion adapted to fit in said pocket and a threaded portion adjacent said smooth portion adapted to receive said threaded portion of the pin, to hold said pin in position.

3. A bolt having a threaded end, said threaded end having a longitudinally-extending groove in the face thereof and extending from the outer edge, the outer end of said groove being enlarged to afford a head-receiving recess, a portion of said groove in the rear of said recess being threaded and the inner portion of said groove being smooth in contour, a nut adapted to be rotated on said threaded portion of the bolt, said nut having a groove therein opening into the bore thereof, the groove in the nut and the smooth portion of the groove in the bolt coacting to form a pin-receiving recess, and a pin having a smooth end adapted to fit into said last-mentioned recess and having a threaded portion in the rear of said smooth portion adapted to thread into the threads in the groove and having an enlarged head adapted to be seated in the enlarged head-receiving portion of the groove in the bolt.

In testimony whereof I have signed my name to this specification in the presence of two subscribing witnesses.

LARKIN BECK.

Witnesses:
J. H. GRAHAM,
A. M. AMSDEN.